US011520990B2

(12) United States Patent
Hebenthal et al.

(10) Patent No.: US 11,520,990 B2
(45) Date of Patent: Dec. 6, 2022

(54) SYSTEMS AND METHODS FOR DYNAMICALLY DISPLAYING A USER INTERFACE OF AN EVALUATION SYSTEM PROCESSING TEXTUAL DATA

(71) Applicant: RELX Inc., New York, NY (US)

(72) Inventors: Douglas C. Hebenthal, Bellevue, WA (US); Cesare John Saretto, Greenbrier, TN (US); James Tracy, Murfreesboro, TN (US); Richard Clinkenbeard, Franklin, TN (US); Christopher Liu, Redmond, WA (US)

(73) Assignee: RELX INC., Miamisburg, OH (US)

(*) Notice: Subject to any disclaimer, the term of this patent is extended or adjusted under 35 U.S.C. 154(b) by 279 days.

(21) Appl. No.: 16/838,535

(22) Filed: Apr. 2, 2020

(65) Prior Publication Data

US 2020/0320254 A1    Oct. 8, 2020

Related U.S. Application Data

(60) Provisional application No. 62/828,876, filed on Apr. 3, 2019.

(51) Int. Cl.
*G06F 40/30* (2020.01)
*G06N 20/00* (2019.01)
*G06N 5/04* (2006.01)

(52) U.S. Cl.
CPC ............ *G06F 40/30* (2020.01); *G06N 5/04* (2013.01); *G06N 20/00* (2019.01)

(58) Field of Classification Search
CPC .. G06F 40/30; G06F 16/90332; G06F 40/216; G06F 17/27; G06F 15/18;
(Continued)

(56) References Cited

U.S. PATENT DOCUMENTS 8,676,731 B1    3/2014   Sathyanarayana et al.
9,519,686 B2 *  12/2016  Bufe, III ............. G06F 16/9535
(Continued)

FOREIGN PATENT DOCUMENTS

KR         101662450         10/2016

OTHER PUBLICATIONS

PCT/US2020/026565, Notification of Transmittal of The International Search Report and The Written Opinion of the International Searching Authority, or the Declaration, dated Jul. 17, 2020.

*Primary Examiner* — Jesse S Pullias
(74) *Attorney, Agent, or Firm* — Dinsmore & Shohl LLP

(57) ABSTRACT

Systems and methods include receiving textual data and a predicted answer to a question associated with a text object. The text object includes a structured data field of the textual data. The predicted answer includes a confidence level. The confidence level is determined by a machine learning system based at least in part on one or more models of the machine learning system and the textual data. In response to determining the confidence level being larger than or equal to a predetermined confidence threshold, the predicted answer and a reference is stored in a storage for retrieval and display. The reference indicates a location of the text object in the textual data. In response to determining the confidence level being smaller than the predetermined confidence threshold, the question and the text object associated with the question is displayed, at the user interface, to a user for inputting a true answer.

24 Claims, 6 Drawing Sheets

(58) Field of Classification Search
CPC .......... G06F 17/30; G06N 5/04; G06N 20/00; G06N 99/00; H04L 12/751
See application file for complete search history.

(56) References Cited

U.S. PATENT DOCUMENTS

| | | |
|---|---|---|
| 9,613,317 B2 | 4/2017 | Beamon et al. |
| 10,108,906 B2 | 10/2018 | Britt et al. |
| 2016/0026378 A1* | 1/2016 | Isensee ............. G06F 16/24578 715/771 |
| 2016/0180237 A1* | 6/2016 | Ahuja .................... G06N 5/022 706/52 |
| 2016/0196491 A1* | 7/2016 | Chandrasekaran .... G06N 20/00 706/50 |
| 2017/0147682 A1 | 5/2017 | Alaqeeli et al. |
| 2019/0303394 A1* | 10/2019 | Byron ................. G06F 16/3344 |
| 2020/0042643 A1* | 2/2020 | Carrier ................... G06F 40/30 |

\* cited by examiner

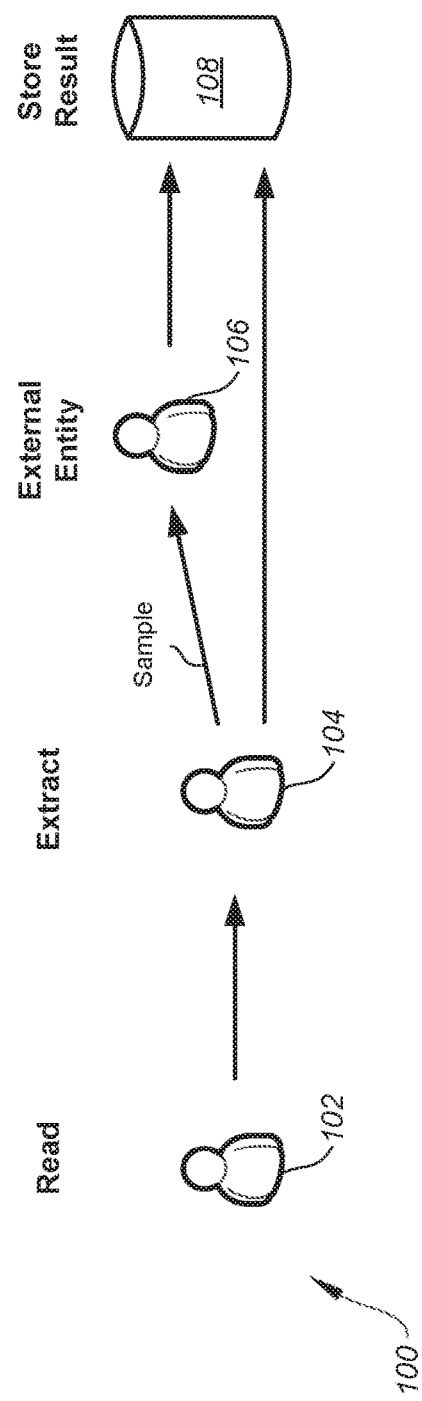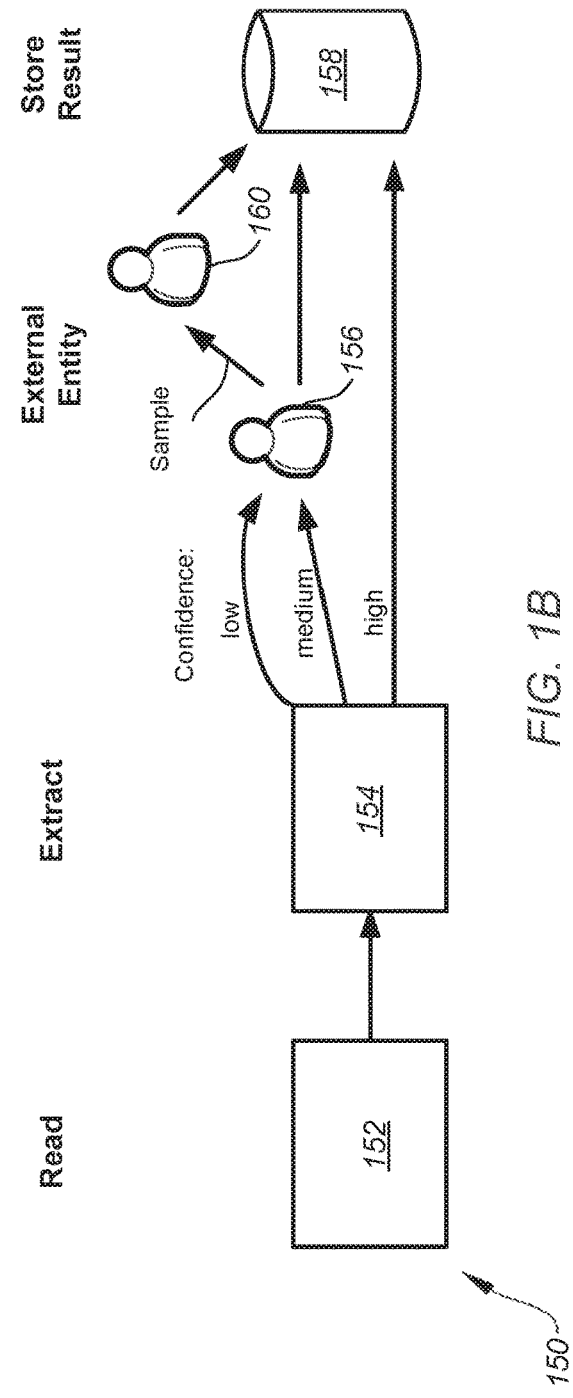
FIG. 1A
FIG. 1B

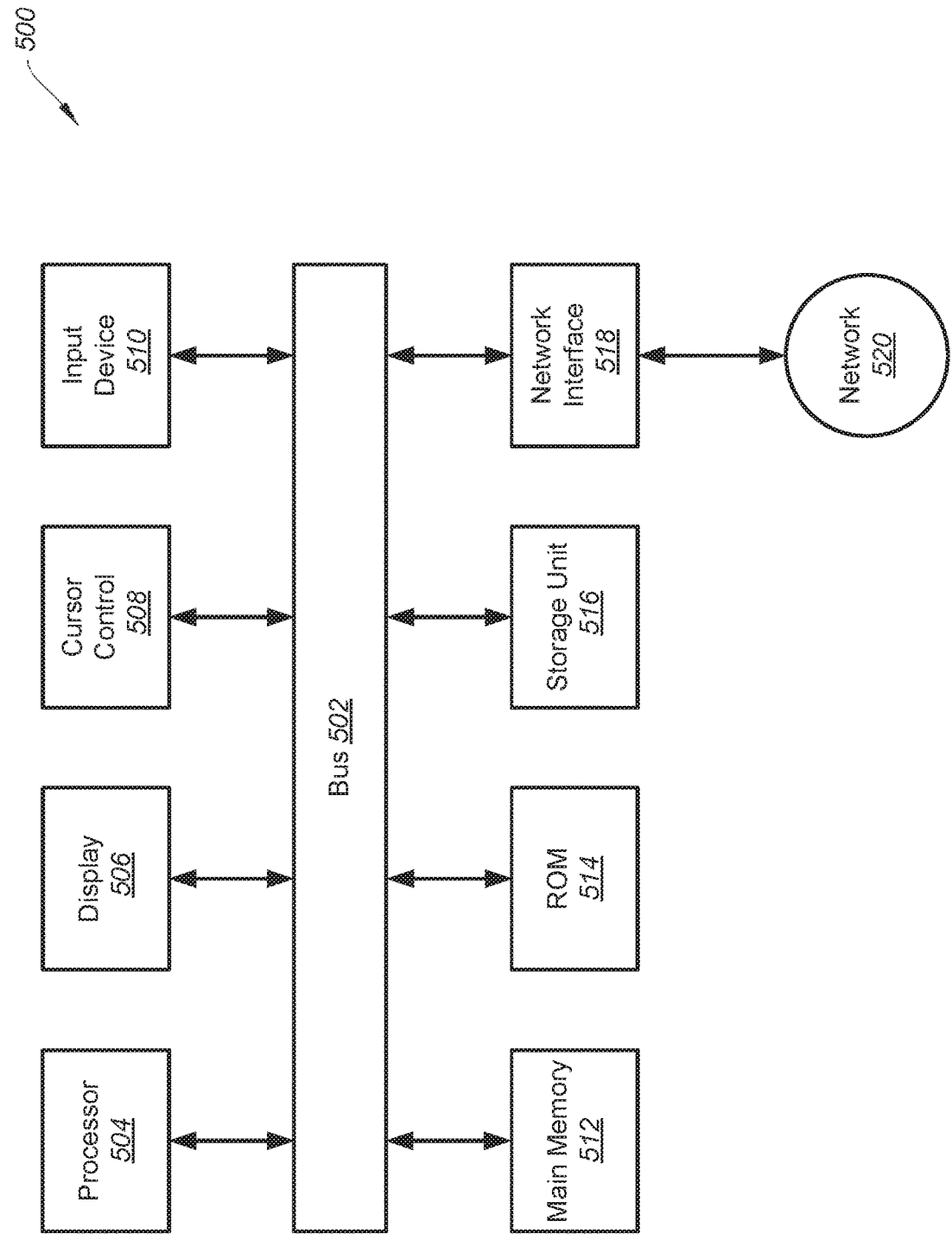

SYSTEMS AND METHODS FOR DYNAMICALLY DISPLAYING A USER INTERFACE OF AN EVALUATION SYSTEM PROCESSING TEXTUAL DATA

1. CROSS-REFERENCE TO RELATED APPLICATIONS

This application claims priority to U.S. Provisional Patent Application No. 62/828,876 entitled "SYSTEMS AND METHODS FOR DYNAMICALLY DISPLAYING A USER INTERFACE OF AN EVALUATION SYSTEM PROCESSING TEXTUAL DATA" and filed on Apr. 3, 2019, which is hereby incorporated by reference in its entirety.

2. BACKGROUND

Certain embodiments of the present invention are directed to evaluation systems processing textual data. More particularly, some embodiments of the present invention provide systems and methods for dynamically displaying a user interface of an evaluation system processing textual data.

With the demands on processing textual data and natural language data ever increasing, machine learning (ML) systems are typically employed in analyzing and categorizing the textual and natural language data and other information included in large numbers of documents and files. To ensure that results predicted by ML systems adhere to user-specified accuracy and tolerance targets, results are subjected to external evaluation. However, conventional evaluation systems employed for reviewing the predicted results typically involve multiple rounds of review by human experts. Furthermore, conventional evaluation systems generally require human experts, on a continuous basis, review different regions of interest within the documents, identify inaccuracies regarding the predicted results, and/or correct the predicted results. The continuous review by human experts is labor intensive, time-consuming, and increases in cost with the number of results that need to be evaluated increasing.

Hence it is highly desirable to provide and/or improve techniques for dynamically displaying a user interface of an evaluation system processing textual data.

3. SUMMARY

Certain embodiments of the present invention are directed to evaluation systems processing textual data. More particularly, some embodiments of the present invention provide systems and methods for dynamically displaying a user interface of an evaluation system processing textual data.

According to some embodiments, a method for dynamically displaying a user interface of an evaluation system configured to evaluate predicted answers generated by a machine learning system includes receiving textual data and a first predicted answer to a question associated with a text object. The text object includes a structured data field of the textual data. The first predicted answer includes a first confidence level. The first confidence level is determined by a machine learning system based at least in part on one or more first models of the machine learning system and the textual data. In response to determining the first confidence level being larger than or equal to a first predetermined confidence threshold, the first predicted answer and a reference is stored in a storage for retrieval and display. The reference indicates a location of the text object in the textual data. In response to determining the confidence level being smaller than the first predetermined confidence threshold: the question and the text object associated with the question is displayed, at the user interface, to a first user for inputting a true answer; and in response to determining the confidence level being larger than or equal to a second predetermined confidence threshold, the first predicted answer and contextual guidance related to the text object is displayed at the user interface. In response to receiving a true answer through the user interface: a first accuracy score associated with the true answer is determined based at least in part on the one or more first models of the machine learning system; the first predetermined confidence threshold is changed based at least in part on the first accuracy score; and the first accuracy score, the true answer, and the reference is stored in the storage for retrieval and display. The first predetermined confidence threshold is larger than or equal to the second predetermined confidence threshold.

According to certain embodiments, a system for dynamically displaying a user interface of an evaluation system configured to evaluate predicted answers generated by a machine learning system includes one or more processors and a memory storing instructions. The instructions, when executed by the one or more processors, cause the system to perform receiving textual data and a predicted answer to a question associated with a text object. The text object includes a structured data field of the textual data. The predicted answer includes a confidence level. The confidence level is determined by a machine learning system based at least in part on one or more models of the machine learning system and the textual data. The instructions, when executed by the one or more processors, cause the system to further perform, in response to determining the confidence level being larger than or equal to a first predetermined confidence threshold, storing the predicted answer and a reference in a storage for retrieval and display. The reference indicates a location of the text object in the textual data. The instructions, when executed by the one or more processors, cause the system to further perform, in response to determining the confidence level being smaller than the first predetermined confidence threshold: displaying, at the user interface, the question and the text object associated with the question to a first user for inputting a true answer; and in response to determining the confidence level being larger than or equal to a second predetermined confidence threshold, displaying, at the user interface, the predicted answer and contextual guidance related to the text object. The instructions, when executed by the one or more processors, cause the system to further perform, in response to receiving a true answer through the user interface: determining an accuracy score associated with the true answer based at least in part on the one or more models of the machine learning system; changing the first predetermined confidence threshold based at least in part on the accuracy score; and storing the accuracy score, the true answer, and the reference in the storage for retrieval and display. The first predetermined confidence threshold is larger than or equal to the second predetermined confidence threshold.

According to some embodiments, a non-transitory computer readable storage medium storing one or more programs is provided. The one or more programs include instructions, when executed by one or more processors, causing a system for dynamically displaying a user interface of an evaluation system configured to evaluate predicted answers generated by a machine learning system to perform receiving textual data and a predicted answer to a question associated with a text object. The text object includes a structured data field of the textual data. The predicted answer includes a confidence level. The confidence level is determined by a machine learning system based at least in part on one or more models of the machine learning system and the textual data. The instructions, when executed by the one or more processors, cause the system to further perform, in response to determining the confidence level being larger than or equal to a first predetermined confidence threshold, storing the predicted answer and a reference in a storage for retrieval and display. The reference indicates a location of the text object in the textual data. The instructions, when executed by the one or more processors, cause the system to further perform, in response to determining the confidence level being smaller than the first predetermined confidence threshold: displaying, at the user interface, the question and the text object associated with the question to a user for inputting a true answer; and in response to determining the confidence level being larger than or equal to a second predetermined confidence threshold, displaying, at the user interface, the predicted answer and contextual guidance related to the text object. The instructions, when executed by the one or more processors, cause the system to further perform, in response to receiving a true answer through the user interface: determining an accuracy score associated with the true answer based at least in part on the one or more models of the machine learning system; changing the first predetermined confidence threshold based at least in part on the accuracy score; and storing the accuracy score, the true answer, and the reference in the storage for retrieval and display. The first predetermined confidence threshold is larger than or equal to the second predetermined confidence threshold.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 1A is a simplified diagram of a conventional evaluation system processing data.

FIG. 1B is a simplified diagram showing an evaluation system processing textual data according to one embodiment of the present invention.

FIG. 5 is a simplified diagram showing a computing system for implementing a system for dynamically displaying a user interface of an evaluation system processing textual data according to one embodiment of the present invention.

5. DETAILED DESCRIPTION

Figure 2:
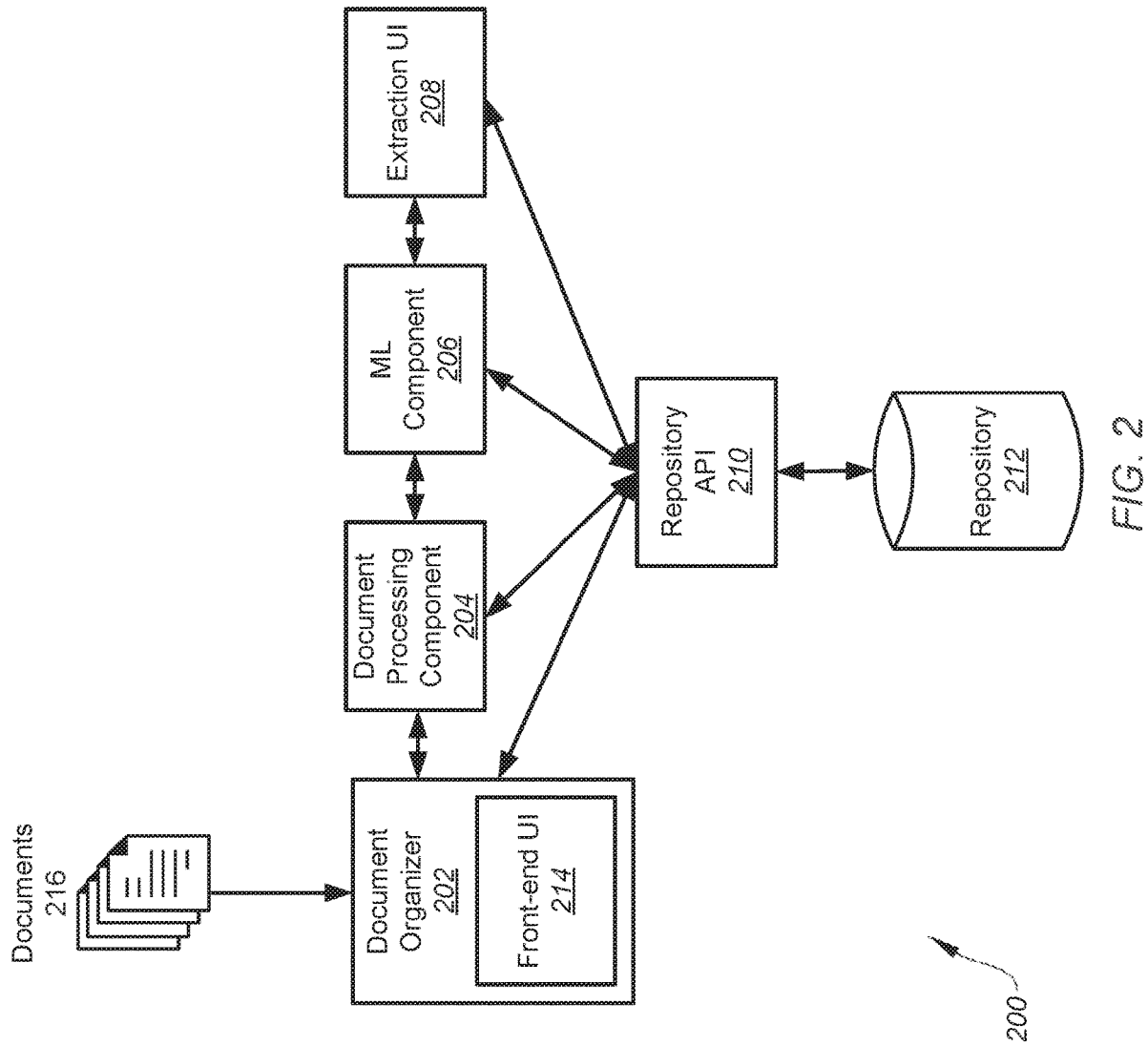
FIG. 2 is a simplified diagram showing a system for dynamically displaying a user interface of an evaluation system processing textual data according to one embodiment of the present invention.

Conventional systems and methods are often not capable of efficiently evaluating the accuracy of results predicted by a machine learning (ML) system. For example, machine learning systems include other prediction systems in addition to systems using machine learning techniques. Conventional systems and methods typically require, on a continuous basis, multiple rounds of review by human experts to ensure that the predicted results comply within user-specified accuracy and/or tolerance targets. More specifically, conventional evaluation systems fail to provide mechanisms to effectively determine whether to a review of particular predicted result is needed.

FIG. 1A is a simplified diagram of a conventional evaluation system 100 processing data. The conventional system 100 for processing textual data of documents includes multiple rounds of manual review. For example, in a first review, a reviewer 102 reads through the textual data of one or more documents to be evaluated. As example, a reviewer 104 extracts metadata for one or more structured data fields included in the textual data of the one or more documents. In some examples, as part of quality control, a sample of the extracted metadata is reviewed by a reviewer 106. In certain examples, the extracted metadata is stored in a repository 108 without further review.

Certain embodiments of the present invention are directed to evaluation systems processing textual data. More particularly, some embodiments of the present invention provide systems and methods for dynamically displaying a user interface of an evaluation system processing textual data. In certain embodiments, one or more solutions rooted in computer technology overcome one or more problems specifically arising in the realm of computer technology.

In some embodiments, systems and methods are provided for dynamically displaying a user interface of an evaluation system processing textual data of documents. In some examples, the systems and methods are configured to evaluate predicted results generated by a machine learning system processing textual data. For example, the predicted results include predictions about the content of contract documents written in natural languages. As an example, the predicted results include answers to questions about a topic related to sections of the documents. In certain examples, the machine learning system are configured to predict the value of certain structured data fields of documents. In some examples, inaccuracies in predicted results are improved upon by collecting additional truth samples through the evaluation system and retaining the machine learning system based at least in part on the additional truth samples. For example, truth samples include predicted results that are reviewed, verified and/or corrected by human experts through the user interface of the evaluation system.

In certain embodiments, the systems and methods are capable to ensure that the predicted results generated by the machine learning system adhere to user-specified accuracy and tolerance targets. For example, the systems and methods are configured to accept an accuracy target and a tolerance target. As an example, an accuracy target is equal to an accuracy value of 95% and a tolerance target is equal to a tolerance target of ±5%. In one example, an accuracy target is equal to an accuracy vale of 99% and a tolerance target is equal to a tolerance target of ±1%. In certain examples, the user-specified accuracy target is related to the confidence level associated with the predicted results generated by the machine learning system. For examples, on historical data the confidence level of 90% relates to an actual accuracy score of 95%. As an example, on new data a confidence level of 95% relates to an actual accuracy score of 95%. In some examples, the systems and methods are configured to adjust displaying the user interface for evaluating the predicted results based on a first predetermined confidence threshold and/or a second predetermined confidence threshold. For example, the first and second predetermined confidence threshold are based on the confidence level. As an example, the first and second predetermined confidence threshold are adjusted in response to the relationship between the user-specified accuracy target and the confidence level changing.

According to some embodiments, the systems and methods are configured to dynamically display predicted results through the user interface to a reviewer based at least in part on a confidence level associated with the predicted results. In some examples, the systems and methods are configured to adjust the information displayed to the reviewer based on the confidence level. For example, the systems and methods are configured to determine whether to display information and what information to display to the reviewed based on at least in part on the confidence level and one or more confidence thresholds. In some examples, the systems and methods provide for quality control of the predicted results and the answers provided by the reviewer.

Benefits of certain embodiments include reducing the cost of reviewing predicted results generated by machine learning systems by reducing and/or eliminating the interactions with the reviewer. In some examples, the number of fields to be extracted (e.g., manually or automatically) for evaluating by a reviewer is reduced. In certain examples, the amount of time required to review the extracted fields is reduced. Other benefits include effective integration of evaluation systems configured to dynamically display a user interface for reviewing predicted results with machine learning systems generating the predicted results to form systems for processing and classifying textual data of documents that adhere to user-specified accuracy and tolerance targets.

FIG. 1B is a simplified diagram showing an evaluation system 150 processing textual data according to one embodiment of the present invention. This diagram is merely an example, which should not unduly limit the scope of the claims. One of ordinary skill in the art would recognize many variations, alternatives, and modifications. For example, the document processing component 152 is configured to parse (e.g., read) through the textual data of one or more documents to be evaluated. As example, the extraction user interface (UI) component 154 is configured to extract metadata for one or more structured data fields included in the textual data of the one or more documents. In some examples, the extraction UI component 154 is configured to display the extracted metadata, predicted results generated by a machine learning system and/or the one or more structured data fields to the reviewer 156 if the confidence level associated with the predicted results is equal to a low confidence value or a medium confidence value. For example, the extraction UI component 154 is configured to change the information displayed to the reviewer 156 based on whether the confidence level is equal to a low confidence level or a medium confidence level. In certain examples, the extraction UI component 154 is configured to store the extracted metadata, the predicted results and/or the one or more structured data fields in the repository 158 without being reviewed. In other examples, as part of quality control, the evaluation system 150 is configured to display a sample of the data reviewed by reviewer 156 to reviewer 160 for an additional review. In some examples, the evaluation system 150 is configured to store the extracted metadata, the predicted results and/or the one or more structured data fields in the repository 158 in addition to the input from reviewer 156 and/or reviewer 160 in the repository 158.

FIG. 2 is a simplified diagram showing a system 200 for dynamically displaying a user interface of an evaluation system processing textual data according to one embodiment of the present invention. This diagram is merely an example, which should not unduly limit the scope of the claims. One of ordinary skill in the art would recognize many variations, alternatives, and modifications. The system 200 includes a document organizer component 202, a document processing component 204, a machine learning component 206, an extraction user interface (UI) component 208, a repository API component 210, and a repository 212. For example, the document organizer component 202 includes a front-end UI component 214 and is configured to organize, categorize, and select documents 216 for storing in the repository 212, and/or further managing and analyzing the documents 216 by the system 200. As an example, the document processing component 204 is included in the repository API component 210.

In some embodiments, documents 216 include textual data and/or content written in natural languages. Examples of documents 216 include contracts, patent licenses, trademark licenses, copyright licenses, technology licenses, joint ventures agreements, confidentiality agreements, research agreements, material supply agreements, manufacturing agreements, statements of work, and amendments and addenda of the forgoing documents. In certain examples, the repository API component 210 is configured to receive data from the document organizer component 202, the document processing component 204, the machine learning component 206, and/or the extraction UI component 208, and store the received data in the repository 212. In other examples, the extraction UI component provides a user interface configured for users to interact with data and documents received from the document organizer component 202, the document processing component 204, the machine learning component 206, and/or the repository API component 210. In some examples, the user interface of the extraction UI component is configured to allow users to interact with data and documents stored in the repository 212.

In certain embodiments, the document processing component 204 is configured to receive data associated with the documents 216 from the document organizer component 202 for further processing. In some examples, the processing by the document processing component 204 includes, for example, applying optical character recognition techniques to the received data of the documents 216. As an example, the document processing component 204 is configured to parse the received data to identify, classify, and mark particular sections within the documents 216. In certain examples, the document processing component 204 is configured to add metadata to the documents 216 based at least in part on the processing of the documents 216. In other examples, the document processing component 204 is configured to convert between formats and/or presentation styles of the data associated with the documents 216, and, for example, generate formatted documents of the converted data. In yet other examples, the document processing component 204 is configured to generate reports, annotations and/or documentations of the processed documents 216.

Figure 3A:
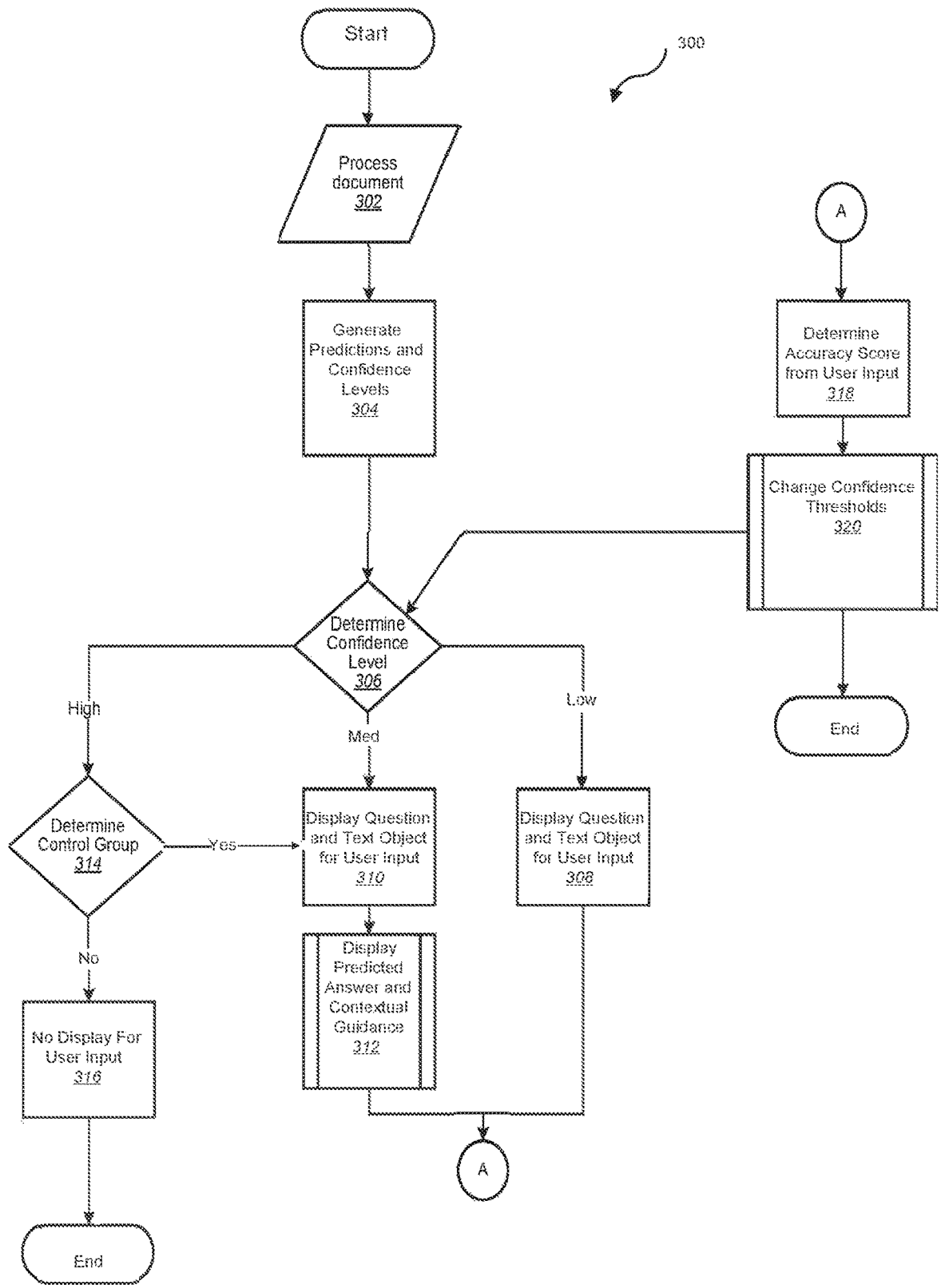
FIG. 3A is a simplified diagram showing a method for dynamically displaying a user interface of the system as shown in FIG. 2 processing textual data according to one embodiment of the present invention.

FIG. 3A is a simplified diagram showing a method 300 for dynamically displaying a user interface of the system 200 processing textual data according to one embodiment of the present invention. This diagram is merely an example, which should not unduly limit the scope of the claims. One of ordinary skill in the art would recognize many variations, alternatives, and modifications. In some examples, the system 200 is configured to evaluate a predicted answer to a question generated by the machine learning component 206. In certain examples, the document processing component 204 is configured to process 302 textual data of one or more documents for dynamically displaying a user interface of the system 200 to evaluate the predicted answer. For example, the document processing component 204 is configured to identify a text object within the textual data of the one or more documents. In some examples, the document processing component 204 is configured to send the textual data of the processed one or more documents to the machine learning component 206 to generate a predicted answer to a question associated with a text object.

In some embodiments, the text object includes a structured data field of the textual data. As an example, the structured data field of textual data includes paragraphs, sentences, headers, blocks, clauses, provisions or sections of documents. In one example, the text object includes metadata and/or annotations associated with the textual data of the structured data field. For example, the metadata includes page numbers, a section numbers, text highlights, and references to structured data fields of the document.

In certain embodiments, the text object includes a reference to the location of the structured data field within the document including the structured data field. For example, the reference represents a link to a certain portion of the document. As an example, the reference includes a page number, a section number, and/or section title associated with the structured data field. In some examples, the text object includes reference to one or more document related to the document including the structured data field of the text object.

According to some embodiments, the machine learning component 206 is configured to generate 304 predictions and confidence levels for the processed one or more documents. For example, the machine learning component is configured to generate predicted results based at least in part on one or more models of the machine learning system. For example, the predicted results include predicted answers to questions associated with textual data of the processed documents. In some examples, the machine learning component 206 is configured to generate predicted answers to questions associated with textual data of the processed documents. In certain examples, the machine learning component 206 is configured to generate a goodness, a predictive error, a robustness value, and/or a confidence level associated with the predicted answer based at least in part on the one or more models of the machine learning system. For example, the one or more models are associated with an accuracy score for a control group of known true answers. As an example, the one or more models are generated by using supervised, semi-supervised and/or unsupervised machine learning techniques. In some examples, the machine learning techniques include neural networks, feature selection and classification, rule-based learning, and/or similarity measure techniques.

According to some embodiments, the machine learning component 206 is configured to generate a confidence level based at least in part on the one or models and the textual data. For example, the predicted answer to the question associated with the text object includes the confidence level. As an example, the text object includes the structured data field of the textual data. In some examples, the extraction UI component 208 is configured to determine whether the text object is associated with a control group of the evaluation system. For example, the control group includes a sample of predicted answers generated by the machine learning component 206 that are selected for accuracy review. In certain examples, the extraction UI component 208 is configured to, in response to determining that the text object is associated with the control group, display, at the user interface, the question, the text object, the predicted answer, and the contextual guidance to a user for inputting a true answer.

According to certain embodiments, the extraction UI component 208 is configured to determine 306 whether the confidence level associated with the predicted answer generated by the machine learning component 206 is equal to a high confidence value, medium confidence value or a low confidence value. In some examples, the extraction UI component 208 is configured to determine that the confidence level is larger than or equal to a first predetermined confidence threshold. For example, a confidence level that is larger than or equal to a first predetermined confidence threshold represents a high confidence value. In certain examples, the extraction UI component 208 is configured to determine that the confidence level is smaller than the first predetermined confidence threshold and larger than a second predetermined confidence threshold. For example, a confidence level that is smaller than the first predetermined threshold and larger than a second predetermined confidence threshold represents a medium confidence value. As an example, the second predetermined confidence threshold is smaller than the first predetermined confidence threshold. In some examples, the extraction UI component 208 is configured to determine that the confidence level is smaller than or equal to the second predetermined confidence threshold. For example, a confidence level that is smaller than or equal to the second predetermined confidence threshold represents a low confidence value.

In some embodiments, the extraction UI component 208 is configured to, in response to determining that the confidence level is equal to a low confidence value, display 308, at a user interface, the question and the text object associated with the question to a user for user input. For example, the structured data field of the textual data are displayed at the user interface. As an example, the user input includes a true answer to the question. In some examples, the threshold extraction UI component 208 is configured to, in response to determining the confidence level being smaller than the first predetermined confidence, display, at the user interface, the question and the text object associated with the question to a user for inputting the true answer to the question. For example, the extraction UI component 208 is configured to receive input from the user and associate the user input with the question and the text object. In certain examples, the threshold extraction UI component 208 is configured to only display, at the user interface, the question and the text object and not the predicted answer if the confidence level is equal to a low confidence value.

In certain embodiments, the extraction UI component 208 is configured to, in response to determining that the confidence level is equal to a medium confidence value, display 310, at a user interface, the question and the text object associated with the question to a user for user input. In some examples, the extraction UI component 208 is configured to, in response to the confidence level being equal to a medium confidence value, display 312, at the user interface, the predicted answer and contextual guidance to the user. In certain examples, the extraction UI component 208 is configured to, in response to determining the first confidence level being larger than or equal to a second predetermined confidence threshold, display 312, at the user interface, the predicted answer and contextual guidance related to the text object. For example, the contextual guidance includes a region of interest in the textual data, a page number, a section number, a text highlight, or an auto-navigation function to the text object.

According to some embodiments, the extraction UI component 208 is configured to, in response to determining that the confidence level is equal to a high confidence value, determine 314 whether the text object is associated with a control group of the system 200. In some examples, the extraction UI component 208 is configured to, in response to determining that the text object is associated with the control group, display 310, at the user interface, the question and the text object. In certain examples, the extraction UI component 208 is configured to, in response to determining that the text object is not associated with the control group, not display 316, at the user interface, the question and the text object for evaluation by a user. In some examples, the system 200 is configured, in response to determining that the text object is not associated with the control group, determine 306 whether the confidence level associated with another predicted answer generated by the machine learning component 206 is equal to a high confidence value, medium confidence value or a low confidence value.

In some embodiments, the extraction UI component 208 is configured to store the confidence level, the predicted answer, and a reference in the repository 212 for retrieval and display. For example, the reference indicates a location of the text object in the textual data. In some examples, the extraction UI component 208 is configured to, in response to receiving user input, send the user input to the machine learning component 206.

In certain embodiments, the machine learning component 206 is configured to, in response to receiving a true answer through the user interface, determine 318 an accuracy score associated with the true answer based at least in part on the one or more models of the machine learning system. For example, the machine learning component 206 is configured to determine 318 the accuracy score for the user input received from the extraction UI component 208.

According to some embodiments, the machine learning component 206 is configured to change 320 the first predetermined confidence threshold based at least in part on the determined accuracy score associated with the true answer. For example, the machine learning component 206 is configured to change whether a confidence level is determined to be equal to a high confidence value or a medium confidence value based at least in part on the determined accuracy score. In some examples, the machine learning component 206 is configured to change 320 the second predetermined confidence threshold based at least in part on the determined accuracy score. For example, the machine learning component 206 is configured to change whether a confidence level is determined to be equal to a medium confidence value or a low confidence value based at least in part on the determined accuracy score. In certain examples, the machine learning component 206 is configured to store the changed first predetermined confidence threshold and/or the changed second predetermined confidence threshold in the repository 212. In some examples, the machine learning component 206 is configured to adjust the first predetermined confidence threshold and the second predetermined confidence threshold to align the accuracy target and the corresponding tolerance specified by the user with the accuracy score and confidence level determined by the machine learning component 206 based on the one or more models of the machine learning system. In certain examples, the machine learning component 206 is configured to, in response to determining the confidence level being smaller than the second predetermined confidence threshold, identifying an accuracy degradation event associated with the predicted answer being generated by a machine learning system.

According to certain embodiments, the system 200 is configured to perform quality control on a control group including a sample of one or more predicted answers. In some examples, the system 200 is configured to display the one or more predicted answers of the control group to be reviewed for accuracy by a second user (e.g., an external entity). In certain examples, the one or more predicted answers of the control group include predicted answers generated by the machine learning component 206. In other examples, the one or more predicted answers of the control group include true answers received through the user interface of the extraction UI component 208.

In some embodiments, the system 200 is configured to increase a sampling rate associated with the sample of the control group if the accuracy score of the one or more predicted answers of the control group is determined to be smaller than a predetermined accuracy threshold. In some examples, the system 200 is configured to decrease the sampling rate if the accuracy score of the one or more predicted answers of the control is determined to be larger than the predetermined accuracy threshold. For example, the system 200 is configured to decrease the sampling rate to a predetermined sampling rate. As an example, the system 200 is configured to decrease the sampling rate after first increasing the sampling rate and if the accuracy score of the one or more predicted answers of the control is determined to be larger than the predetermined accuracy threshold.

Figure 3B:
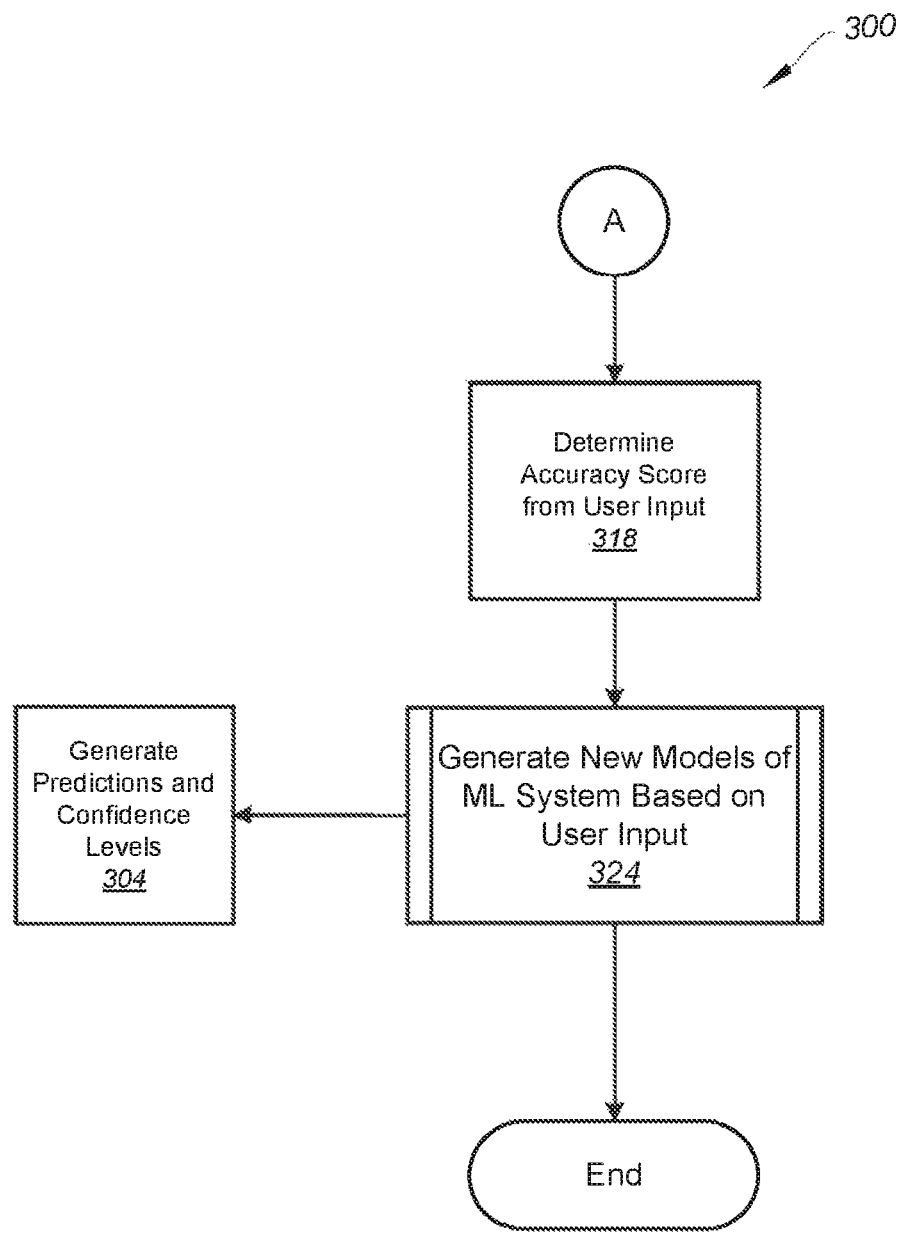
FIG. 3B is a simplified diagram showing parts of the method as shown in FIG. 3A processing textual data according to one embodiment of the present invention.

FIG. 3B is a simplified diagram showing parts of the method 300 processing textual data according to one embodiment of the present invention. This diagram is merely an example, which should not unduly limit the scope of the claims. One of ordinary skill in the art would recognize many variations, alternatives, and modifications. In some examples, the machine learning component 206 is configured to, in response to receiving a true answer through the user interface, generate 324 one or more new models of the machine learning systems for predicting answers. In certain examples, the machine learning component 206 is configured to determine 318 the accuracy score associated with the true answer based at least in part on the one or more new models of the machine learning system. For example, the extraction UI component 208 is configured to receive a predicted answer including a confidence level that is determined by the machine learning system based at least in part on the one or more new models and the textual data.

Figure 4:
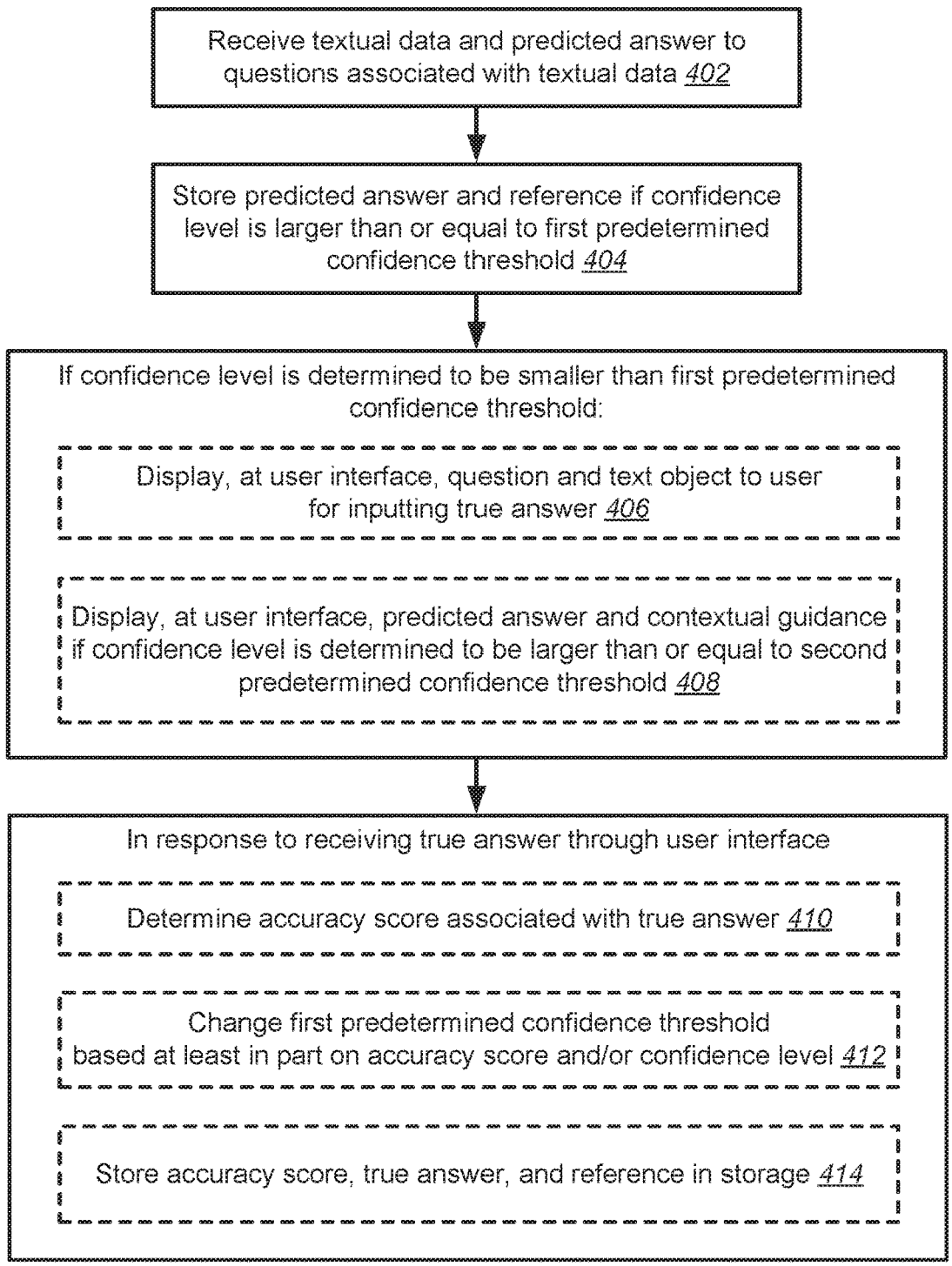
FIG. 4 is a simplified diagram showing a method for dynamically displaying a user interface of an evaluation system processing textual data according to one embodiment of the present invention.

FIG. 4 is a simplified diagram showing a method for dynamically displaying a user interface of an evaluation system processing textual data according to one embodiment of the present invention. This diagram is merely an example, which should not unduly limit the scope of the claims. One of ordinary skill in the art would recognize many variations, alternatives, and modifications. The method 400 includes processes 402-414 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 400 are performed by the system 100. In certain examples, some or all processes (e.g., steps) of the method 400 are performed by a computer and/or a processor directed by a code. For example, a computer includes a server computer and/or a client computer (e.g., a personal computer). In some examples, some or all processes (e.g., steps) of the method 400 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 402, textual data and a predicted answer to a question associated with a text object is received. The text object includes a structured data field of the textual data. The predicted answer includes a confidence level. The confidence level is determined by a machine learning system based at least in part on one or more models of the machine learning system and the textual data. At the process 404, in response to determining the confidence level being larger than or equal to a first predetermined confidence threshold, the predicted answer and a reference is stored in a storage for retrieval and display. The reference indicates a location of the text object in the textual data. In response to determining the confidence level being smaller than the first predetermined confidence threshold: at process 406, the question and the text object associated with the question is displayed, at the user interface, to a user for inputting a true answer; and, at process 408, in response to determining the confidence level being larger than or equal to a second predetermined confidence threshold, the predicted answer and contextual guidance related to the text object is displayed at the user interface. In response to receiving a true answer through the user interface: at process 410, an accuracy score associated with the true answer is determined based at least in part on the one or more models of the machine learning system; at process 412, the first predetermined confidence threshold is changed based at least in part on the accuracy score and/or the confidence level; and, at process 414, the first accuracy score, the true answer, and the reference is stored in the storage for retrieval and display. The first predetermined confidence threshold is larger than or equal to the second predetermined confidence threshold.

FIG. 5 is a simplified diagram showing a computing system for implementing a system for dynamically displaying a user interface of an evaluation system processing textual data according to one embodiment of the present invention. This diagram is merely an example, which should not unduly limit the scope of the claims. One of ordinary skill in the art would recognize many variations, alternatives, and modifications. The computing system 500 includes a bus 502 or other communication mechanism for communicating information, a processor 504, a display 506, a cursor control component 508, an input device 510, a main memory 512, a read only memory (ROM) 514, a storage unit 516, and a network interface 518. In some embodiments, some or all processes (e.g., steps) of the method 400 are performed by the computing system 500. In some examples, the bus 502 is coupled to the processor 504, the display 506, the cursor control component 508, the input device 510, the main memory 512, the read only memory (ROM) 514, the storage unit 516, and/or the network interface 518. In certain examples, the network interface is coupled to a network 520. For example, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For examples, the instructions, when stored in the storage unit 516 accessible to processor 504, render the computing system 500 into a special-purpose machine that is customized to perform the operations specified in the instructions. In some examples, the ROM 514 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

According to some embodiments, a method for dynamically displaying a user interface of an evaluation system configured to evaluate predicted answers generated by a machine learning system includes receiving textual data and a first predicted answer to a question associated with a text object. The text object includes a structured data field of the textual data. The first predicted answer includes a first confidence level. The first confidence level is determined by a machine learning system based at least in part on one or more first models of the machine learning system and the textual data. In response to determining the first confidence level being larger than or equal to a first predetermined confidence threshold, the first predicted answer and a reference is stored in a storage for retrieval and display. The reference indicates a location of the text object in the textual data. In response to determining the confidence level being smaller than the first predetermined confidence threshold: the question and the text object associated with the question is displayed, at the user interface, to a first user for inputting a true answer; and in response to determining the confidence level being larger than or equal to a second predetermined confidence threshold, the first predicted answer and contextual guidance related to the text object is displayed at the user interface. In response to receiving a true answer through the user interface: a first accuracy score associated with the true answer is determined based at least in part on the one or more first models of the machine learning system; the first predetermined confidence threshold is changed based at least in part on the first accuracy score; and the first accuracy score, the true answer, and the reference is stored in the storage for retrieval and display. The first predetermined confidence threshold is larger than or equal to the second predetermined confidence threshold. For example, the method is implemented according to at least FIG. 2, FIG. 3A, FIG. 3B and/or FIG. 4.

In some examples, first predetermined confidence threshold is larger than the second predetermined confidence threshold. In certain examples, the method further includes storing the changed first predetermined confidence threshold in the storage for retrieval and display. In some examples, the method further includes changing the second predetermined confidence threshold based at least in part on the first accuracy score in response to receiving the true answer through the user interface.

In certain examples, the method further includes: generating the first predicted answer to the question based at least in part on the one or more first models of the machine learning system; and determining the first confidence level based at least in part on the one or more first models of the machine learning system, the first confidence level being associated with the first predicted answer.

In some examples, the method further includes, in response to determining the first confidence level being larger than or equal to a first predetermined confidence threshold: determining whether the text object is associated with a control group of the evaluation system; and in response to determining that the text object is associated with the control group, displaying, at the user interface, the question and the text object to a first user for inputting a true answer.

In certain examples, the text object associated with the control group is reviewed for accuracy by a second user. For example, one or more predicted answers of the control group include predicted answers generated by the machine learning system. As an example, one or more predicted answers of the control group include the received true answer from the second user.

In some examples, the method further includes in response to determining a second accuracy score of the one or more predicted answers of the control group being smaller than a predetermined accuracy threshold, increasing a sampling rate associated with the sample of the control group. For example, the method further includes, in response to determining a third accuracy score of the one or more predicted answers of the control group being larger than the predetermined accuracy threshold, decreasing the sampling rate associated with the sample of the control group.

In certain examples, the method further includes: determining whether the text object is associated with a control group of the evaluation system; and in response to determining that the text object is associated with the control group, displaying, at the user interface, the question and the text object to a first user for inputting a true answer.

In some examples, the contextual guidance includes a region of interest in the textual data, a page number, a section number, a text highlight, or an auto-navigation function to the text object. In certain examples, the method further includes sending the true answer to the machine learning system for generating one or more second models based at least in part on the true answer. For examples, the method further includes receiving a second predicted answer to the question. The second predicted answer includes a second confidence level. The second confidence level is determined by the machine learning system based at least in part on the one or more second models and the textual data. In some examples, the method further includes, in response to determining the first confidence level being smaller than the second predetermined confidence threshold, identifying an accuracy degradation event associated with the first predicted answer being generated by a machine learning system.

According to certain embodiments, a system for dynamically displaying a user interface of an evaluation system configured to evaluate predicted answers generated by a machine learning system includes one or more processors and a memory storing instructions. The instructions, when executed by the one or more processors, cause the system to perform receiving textual data and a first predicted answer to a question associated with a text object. The text object includes a structured data field of the textual data. The first predicted answer includes a first confidence level. The first confidence level is determined by a machine learning system based at least in part on one or more first models of the machine learning system and the textual data. The instructions, when executed by the one or more processors, cause the system to further perform, in response to determining the first confidence level being larger than or equal to a first predetermined confidence threshold, storing the first predicted answer and a reference in a storage for retrieval and display. The reference indicates a location of the text object in the textual data. The instructions, when executed by the one or more processors, cause the system to further perform, in response to determining the confidence level being smaller than the first predetermined confidence threshold: displaying, at the user interface, the question and the text object associated with the question to a first user for inputting a true answer; and in response to determining the confidence level being larger than or equal to a second predetermined confidence threshold, displaying, at the user interface, the first predicted answer and contextual guidance related to the text object. The instructions, when executed by the one or more processors, cause the system to further perform, in response to receiving a true answer through the user interface: determining a first accuracy score associated with the true answer based at least in part on the one or more first models of the machine learning system; changing the first predetermined confidence threshold based at least in part on the first accuracy score; and storing the first accuracy score, the true answer, and the reference in the storage for retrieval and display. The first predetermined confidence threshold is larger than or equal to the second predetermined confidence threshold. For example, the system is implemented according to at least FIG. 2, FIG. 3A, FIG. 3B and/or FIG. 4.

In some examples, the first predetermined confidence threshold is larger than the second predetermined confidence threshold. In certain examples, the instructions, when executed by the one or more processors, cause the system to further perform storing the changed first predetermined confidence threshold in the storage for retrieval and display. In some examples, the instructions, when executed by the one or more processors, cause the system to further perform changing the second predetermined confidence threshold based at least in part on the first accuracy score in response to receiving the true answer through the user interface.

In certain examples, the instructions, when executed by the one or more processors, cause the system to further perform: generating the predicted answer to the question based at least in part on the one or more models of the machine learning system; and determining the confidence level based at least in part on the one or more models of the machine learning system, the confidence level being associated with the predicted answer. In other examples, the instructions, when executed by the one or more processors, cause the system to further perform, in response to determining the confidence level being larger than or equal to a first predetermined confidence threshold: determining whether the text object is associated with a control group of the evaluation system; and in response to determining that the text object is associated with the control group, displaying, at the user interface, the question and the text object to a first user for inputting a true answer.

In some examples, the text object associated with the control group is reviewed for accuracy by a second user. In certain examples, one or more predicted answers of the control group include predicted answers generated by the machine learning system. In some examples, one or more predicted answers of the control group include the received true answer from the second user.

According to some embodiments, a non-transitory computer readable storage medium storing one or more programs is provided. The one or more programs include instructions, when executed by one or more processors, causing a system for dynamically displaying a user interface of an evaluation system configured to evaluate predicted answers generated by a machine learning system to perform receiving textual data and a predicted answer to a question associated with a text object. The text object includes a structured data field of the textual data. The predicted answer includes a confidence level. The confidence level is determined by a machine learning system based at least in part on one or more models of the machine learning system and the textual data. The instructions, when executed by the one or more processors, cause the system to further perform, in response to determining the confidence level being larger than or equal to a first predetermined confidence threshold, storing the predicted answer and a reference in a storage for retrieval and display. The reference indicates a location of the text object in the textual data. The instructions, when executed by the one or more processors, cause the system to further perform, in response to determining the confidence level being smaller than the first predetermined confidence threshold: displaying, at the user interface, the question and the text object associated with the question to a user for inputting a true answer; and in response to determining the confidence level being larger than or equal to a second predetermined confidence threshold, displaying, at the user interface, the predicted answer and contextual guidance related to the text object. The instructions, when executed by the one or more processors, cause the system to further perform, in response to receiving a true answer through the user interface: determining an accuracy score associated with the true answer based at least in part on the one or more models of the machine learning system; changing the first predetermined confidence threshold based at least in part on the accuracy score; and storing the accuracy score, the true answer, and the reference in the storage for retrieval and display. The first predetermined confidence threshold is larger than or equal to the second predetermined confidence threshold. For example, the non-transitory computer readable storage medium is implemented according to at least FIG. 2, FIG. 3A, FIG. 3B and/or FIG. 4.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for dynamically displaying a user interface of an evaluation system configured to evaluate predicted answers generated by a machine learning system, the method comprising:
   receiving textual data and a first predicted answer to a question associated with a text object, the text object including a structured data field of the textual data, the first predicted answer including a first confidence level, the first confidence level being determined by a machine learning system based at least in part on one or more first models of the machine learning system and the textual data;
   in response to determining the first confidence level being larger than or equal to a first predetermined confidence threshold, storing the first predicted answer and a reference in a storage for retrieval and display, the reference indicating a location of the text object in the textual data;
   in response to determining the first confidence level being smaller than the first predetermined confidence threshold:
      displaying, at the user interface, the question and the text object associated with the question to a first user for inputting a true answer; and
      in response to determining the first confidence level being larger than or equal to a second predetermined confidence threshold, displaying, at the user interface, the first predicted answer and contextual guidance related to the text object; and
   in response to receiving a true answer through the user interface:
      determining a first accuracy score associated with the true answer based at least in part on the one or more first models of the machine learning system;
      changing the first predetermined confidence threshold based at least in part on the first accuracy score;
      changing the second predetermined confidence threshold based at least in part on the first accuracy score in response to receiving the true answer through the user interface;
      storing the first accuracy score, the true answer, and the reference in the storage for retrieval and display;
   wherein the first predetermined confidence threshold is larger than or equal to the second predetermined confidence threshold.

2. The method of claim 1 wherein the first predetermined confidence threshold is larger than the second predetermined confidence threshold.

3. The method of claim 1, and further comprising:
   storing the changed first predetermined confidence threshold in the storage for retrieval and display.

4. The method of claim 1, and further comprising:
   generating the first predicted answer to the question based at least in part on the one or more first models of the machine learning system; and
   determining the first confidence level based at least in part on the one or more first models of the machine learning system, the first confidence level being associated with the first predicted answer.

5. The method of claim 1, and further comprising:
   in response to determining the first confidence level being larger than or equal to a first predetermined confidence threshold:
      determining whether the text object is associated with a control group of the evaluation system; and
      in response to determining that the text object is associated with the control group, displaying, at the user interface, the question and the text object to a first user for inputting a true answer.

6. The method of claim 5 wherein:
   the text object associated with the control group is reviewed for accuracy by a second user.

7. The method of claim 6 wherein one or more predicted answers of the control group include predicted answers generated by the machine learning system.

8. The method of claim 6 wherein one or more predicted answers of the control group include the received true answer from the second user.

9. The method of claim 6, and further comprising:
   in response to determining a second accuracy score of the one or more predicted answers of the control group being smaller than a predetermined accuracy threshold, increasing a sampling rate associated with the statistical sample of the control group.

10. The method of claim 9, and further comprising:
    in response to determining a third accuracy score of the one or more predicted answers of the control group being larger than the predetermined accuracy threshold, decreasing the sampling rate associated with the statistical sample of the control group.

11. The method of claim 1, and further comprising:
    determining whether the text object is associated with a control group of the evaluation system; and
    in response to determining that the text object is associated with the control group, displaying, at the user interface, the question and the text object to a first user for inputting a true answer.

12. The method of claim 1 wherein the contextual guidance includes a region of interest in the textual data, a page number, a section number, a text highlight, or an auto-navigation function to the text object.

13. The method of claim 1, and further comprising:
    sending the true answer to the machine learning system for generating one or more second models based at least in part on the true answer.

14. The method of claim 13, and further comprising:
    receiving a second predicted answer to the question, the second predicted answer including a second confidence level, the second confidence level being determined by the machine learning system based at least in part on the one or more second models and the textual data.

15. The method of claim 1, and further comprising:
    in response to determining the first confidence level being smaller than the second predetermined confidence threshold, identifying an accuracy degradation event associated with the first predicted answer being generated by a machine learning system.

16. A system for dynamically displaying a user interface of an evaluation system configured to evaluate predicted answers generated by a machine learning system, the system comprising:
one or more processors; and
a memory storing instructions, the instructions, when executed by the one or more processors, causing the system to perform:
receiving textual data and a predicted answer to a question associated with a text object, the text object including a structured data field of the textual data, the predicted answer including a confidence level, the confidence level being determined by a machine learning system based at least in part on one or more models of the machine learning system and the textual data;
in response to determining the confidence level being larger than or equal to a first predetermined confidence threshold, storing the predicted answer and a reference in a storage for retrieval and display, the reference indicating a location of the text object in the textual data;
in response to determining the confidence level being smaller than the first predetermined confidence threshold:
displaying, at the user interface, the question and the text object associated with the question to a first user for inputting a true answer; and
in response to determining the confidence level being larger than or equal to a second predetermined confidence threshold, displaying, at the user interface, the predicted answer and contextual guidance related to the text object; and
in response to receiving a true answer through the user interface:
determining an accuracy score associated with the true answer based at least in part on the one or more models of the machine learning system;
changing the first predetermined confidence threshold based at least in part on the accuracy score;
changing the second predetermined confidence threshold based at least in part on the accuracy score in response to receiving the true answer through the user interface; and
storing the accuracy score, the true answer, and the reference in the storage for retrieval and display;
wherein the first predetermined confidence threshold is larger than or equal to the second predetermined confidence threshold.

17. The system of claim 16 wherein the first predetermined confidence threshold is larger than the second predetermined confidence threshold.

18. The system of claim 16 wherein the instructions, when executed by the one or more processors, causing the system to further perform:
storing the changed first predetermined confidence threshold in the storage for retrieval and display.

19. The system of claim 16 wherein the instructions, when executed by the one or more processors, causing the system to further perform:
generating the predicted answer to the question based at least in part on the one or more models of the machine learning system; and
determining the confidence level based at least in part on the one or more models of the machine learning system, the confidence level being associated with the predicted answer.

20. The system of claim 16 wherein the instructions, when executed by the one or more processors, causing the system to further perform:
in response to determining the confidence level being larger than or equal to a first predetermined confidence threshold:
determining whether the text object is associated with a control group of the evaluation system; and
in response to determining that the text object is associated with the control group, displaying, at the user interface, the question and the text object to a first user for inputting a true answer.

21. The system of claim 20 wherein:
the text object associated with the control group is reviewed for accuracy by a second user.

22. The system of claim 21 wherein one or more predicted answers of the control group include predicted answers generated by the machine learning system.

23. The system of claim 21 wherein one or more predicted answers of the control group include the received true answer from the second user.

24. A non-transitory computer readable storage medium storing one or more programs, the one or more programs comprising instructions, when executed by one or more processors, causing a system for dynamically displaying a user interface of an evaluation system configured to evaluate predicted answers generated by a machine learning system to perform:
receiving textual data and a predicted answer to a question associated with a text object, the text object including a structured data field of the textual data, the predicted answer including a confidence level, the confidence level being determined by a machine learning system based at least in part on one or more models of the machine learning system and the textual data;
in response to determining the confidence level being larger than or equal to a first predetermined confidence threshold, storing the predicted answer and a reference in a storage for retrieval and display, the reference indicating a location of the text object in the textual data;
in response to determining the confidence level being smaller than the first predetermined confidence threshold:
displaying, at the user interface, the question and the text object associated with the question to a user for inputting a true answer; and
in response to determining the confidence level being larger than or equal to a second predetermined confidence threshold, displaying, at the user interface, the first predicted answer and contextual guidance related to the text object; and
in response to receiving a true answer through the user interface:
determining an accuracy score associated with the true answer based at least in part on the one or more models of the machine learning system;
changing the first predetermined confidence threshold based at least in part on the accuracy score;
changing the second predetermined confidence threshold based at least in part on the first accuracy score in response to receiving the true answer through the user interface;
storing the accuracy score, the true answer, and the reference in the storage for retrieval and display;

wherein the first predetermined confidence threshold is larger than or equal to the second predetermined confidence threshold.

\* \* \* \* \*